(12) United States Patent
Zhu et al.

(10) Patent No.: US 11,748,026 B2
(45) Date of Patent: Sep. 5, 2023

(54) MAPPING INFORMATION RECORDING METHOD, MEMORY CONTROL CIRCUIT UNIT, AND MEMORY STORAGE DEVICE

(71) Applicant: Hefei Core Storage Electronic Limited, Anhui (CN)

(72) Inventors: Qi-Ao Zhu, Anhui (CN); Jing Zhang, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 99 days.

(21) Appl. No.: 17/553,664

(22) Filed: Dec. 16, 2021

(65) Prior Publication Data

US 2023/0132837 A1 May 4, 2023

(30) Foreign Application Priority Data

Oct. 28, 2021 (CN) .......................... 202111266749.7

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0604; G06F 3/0655; G06F 3/0679
See application file for complete search history.

(56) References Cited

U.S. PATENT DOCUMENTS

| 2019/0163621 A1* | 5/2019 | Doh | G06F 12/0246 |
| 2020/0057725 A1* | 2/2020 | Cho | G06F 12/0246 |

FOREIGN PATENT DOCUMENTS

| TW | I506430 | 11/2015 |
| TW | 201933101 | 8/2019 |

* cited by examiner

Primary Examiner — Jane W Benner
(74) Attorney, Agent, or Firm — JCIPRNET (57) ABSTRACT

A mapping information recording method for a rewritable non-volatile memory module is provided. The rewritable non-volatile memory module includes multiple physical erasing units, and each of the physical erasing unit includes multiple physical programming units. The mapping information recording method includes: receiving first continuous data from a host system, wherein the host system instructs to store the first continuous data to a first continuous logical address; establishing a continuous mapping table to record a start logical address of the first continuous logical address, a length of the first continuous logical address, and a bitmap; writing the first continuous data into first physical programming units; and marking bits of virtual blocks corresponding to the first continuous logical address in the bitmap as a valid state, numbering the virtual blocks, and recording the numbers into the continuous mapping table.

21 Claims, 8 Drawing Sheets

| 1101 | 1102 | 1103 |
|---|---|---|
| Start logical address field | Length field | Virtual block number field |
| LBA(1) | 24KB | VB0 |
| ⋮ | ⋮ | ⋮ |

MAPPING INFORMATION RECORDING METHOD, MEMORY CONTROL CIRCUIT UNIT, AND MEMORY STORAGE DEVICE

CROSS-REFERENCE TO RELATED APPLICATION

This application claims the priority benefit of China application serial no. 202111266749.7, filed on Oct. 28, 2021. The entirety of the above-mentioned patent application is hereby incorporated by reference herein and made a part of this specification.

BACKGROUND

Technical Field

The disclosure relates to a mapping information recording method, a memory control circuit unit, and a memory storage device.

Description of Related Art

Digital cameras, mobile phones, and MP3 players have grown rapidly over the past few years, which has led to a rapid increase in consumer demand for storage media. Since the rewritable non-volatile memory has characteristics such as non-volatile data, power saving, small size, no mechanical structure, and fast read and write speed, the rewritable non-volatile memory module is most suitable for portable electronic products, such as notebook computers. A solid state drive is a storage device that uses a flash memory as a storage medium. Therefore, the flash memory industry has become a very popular part in the electronics industry in recent years.

Generally speaking, a memory storage device that uses a rewritable non-volatile memory module as a storage medium establishes a logical-physical mapping table to record mapping information between a logical address and a physical erasing unit or the logical address and a physical programming unit, so that a host system can smoothly access data of the rewritable non-volatile memory module. Alternatively, for continuously written data, the memory storage device establishes a continuous mapping table in response to subsequent random reading of written data to record a start logical address corresponding to the continuously written data, a start physical programming unit, and the length of the continuously written data. A mapping relationship between the logical address and the physical programming unit is recorded with less amount of data, so that the continuously written data can be randomly read more quickly and effectively in a limited random access memory space of a flash memory storage system. However, in this way, after continuously writing data into the rewritable non-volatile memory module, if a part of the continuously written data is overwritten, the continuous mapping table may easily become invalid and the continuous mapping table can no longer be used to read data.

Therefore, how to effectively record the mapping relationship between the logical address and the physical address to improve the access speed of data is the goal for persons skilled in the art.

SUMMARY

The disclosure provides a mapping information recording method, a memory controller, and a memory storage device, which can effectively use a continuous mapping table to read written data to improve the access speed of data.

An exemplary embodiment of the disclosure provides a mapping information recording method for a rewritable non-volatile memory module. The rewritable non-volatile memory module includes multiple physical erasing units. Each of the physical erasing units includes multiple physical programming units. The mapping information recording method includes the following steps. Multiple first continuous data are received from a host system. The host system instructs to store the first continuous data to multiple first continuous logical addresses in multiple logical addresses. At least one continuous mapping table is established. The at least one continuous mapping table is used to record a start logical address of the first continuous logical addresses to which the first continuous data are stored, a length of the first continuous logical addresses, and a bitmap. The first continuous data are written into multiple first physical programming units in the physical programming units of the physical erasing units. Bits of multiple virtual blocks corresponding to the first continuous logical addresses in the bitmap are marked as a valid state, the virtual blocks are numbered, and the numbers are recorded into the at least one continuous mapping table.

Another exemplary embodiment of the disclosure provides a memory storage device, which includes a connection interface unit, a rewritable non-volatile memory module, and a memory control circuit unit. The connection interface unit is used to couple to a host system. The rewritable non-volatile memory module includes multiple physical erasing units. Each of the physical erasing units includes multiple physical programming units. The memory control circuit unit is coupled to the connection interface unit and the rewritable non-volatile memory module. The memory control circuit unit is used to receive multiple first continuous data from the host system. The host system instructs to store the first continuous data to multiple first continuous logical addresses in multiple logical addresses. The memory control circuit unit is further used to establish at least one continuous mapping table. The at least one continuous mapping table is used to record a start logical address of the first continuous logical addresses to which the first continuous data are stored, a length of the first continuous logical addresses, and a bitmap. The memory control circuit unit is further used to write the first continuous data into multiple first physical programming units in the physical programming units of the physical erasing units. The memory control circuit unit is further used to mark bits of multiple virtual blocks corresponding to the first continuous logical addresses in the bitmap as a valid state, number the virtual blocks, and record the numbers into the at least one continuous mapping table.

Another exemplary embodiment of the disclosure provides a memory control circuit unit for controlling a memory storage device. The memory control circuit unit includes a host interface, a memory interface, and a memory management circuit. The host interface is used to couple to a host system. The memory interface is used to couple to a rewritable non-volatile memory module. The rewritable non-volatile memory module includes multiple physical erasing units. Each of the physical erasing units includes multiple physical programming units. The memory management circuit is coupled to the host interface and the memory interface. The memory management circuit is used to receive multiple first continuous data from the host system. The host system instructs to store the first continuous data to multiple first continuous logical addresses in multiple logical addresses. The memory management circuit is used to establish at least one continuous mapping table. The at least one continuous mapping table is used to record a start logical address of the first continuous logical addresses to which the first continuous data are stored, a length of the first continuous logical addresses, and a bitmap. The memory management circuit is used to write the first continuous data into multiple first physical programming units in the physical programming units of the physical erasing units. The memory management circuit is used to mark bits of multiple virtual blocks corresponding to the first continuous logical addresses in the bitmap as a valid state, number the virtual blocks, and record the numbers into the at least one continuous mapping table.

In the mapping information recording method, the memory controller, and the memory storage device provided by the embodiments of the disclosure, the continuous mapping table is established to record the start logical address of the written continuous data, the length of the continuous data, the numbers of the virtual blocks, and the bitmap. Data is read from the rewritable non-volatile memory module through selecting whether to call the continuous mapping table or a logical-physical address mapping table, so as to randomly read the written data more quickly and effectively in a limited random access memory space of a flash memory storage system to effectively improve the performance of the flash memory storage system.

In order for the features and advantages of the disclosure to be more comprehensible, the following specific embodiments are described in detail in conjunction with the accompanying drawings.

DETAILED DESCRIPTION OF DISCLOSED EMBODIMENTS

Generally speaking, a memory storage device (also known as a memory storage system) includes a rewritable non-volatile memory module and a controller (also known as a control circuit). Usually, the memory storage device is used together with a host system, so that the host system may write data into the memory storage device or read data from the memory storage device.

Figure 1:
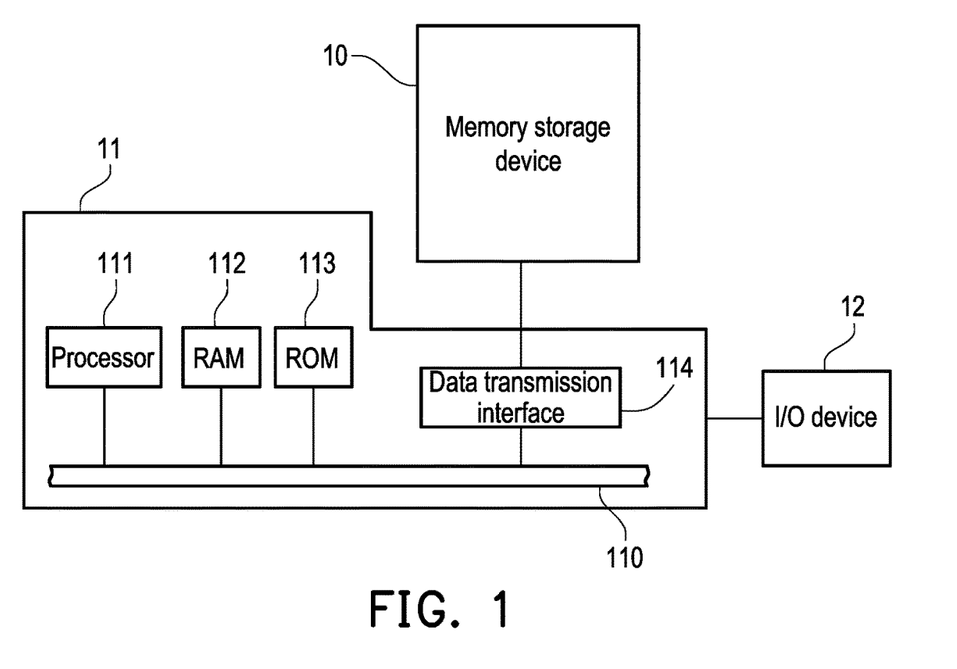
FIG. 1 is a schematic diagram of a host system, a memory storage device, and an input/output (I/O) device according to an exemplary embodiment of the disclosure.
Figure 2:
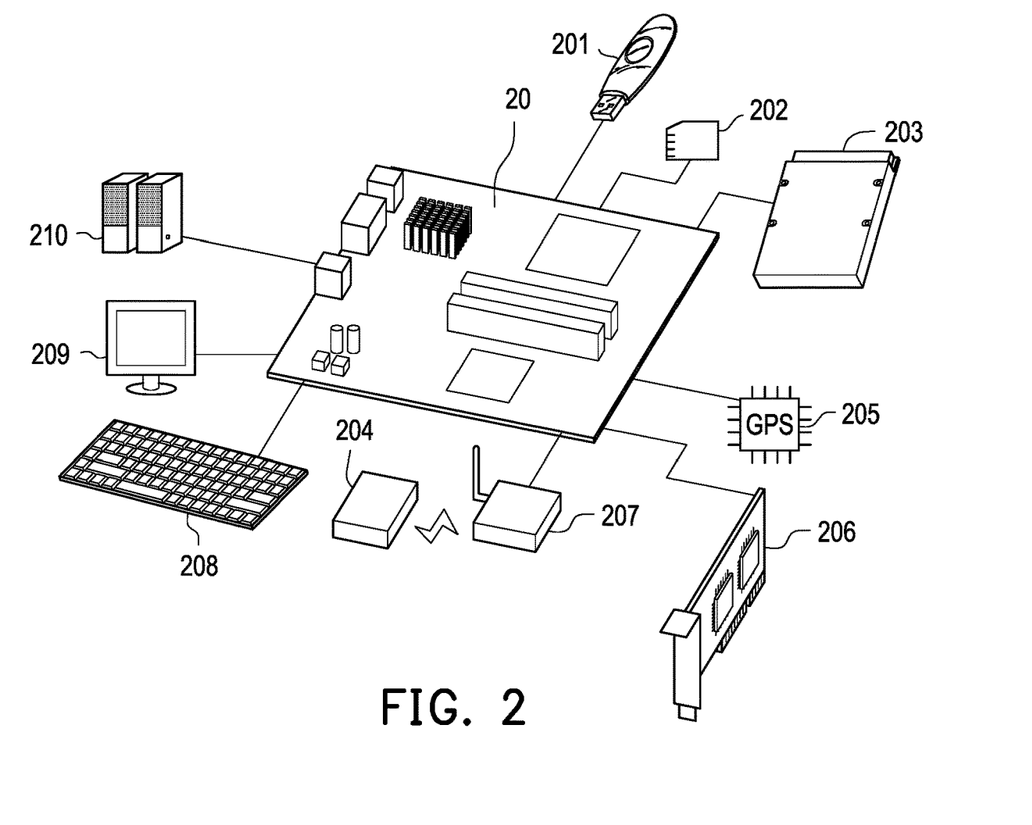
FIG. 2 is a schematic diagram of a host system, a memory storage device, and an I/O device according to another exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to another exemplary embodiment of the disclosure.

Please refer to FIG. 1 and FIG. 2. A host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In the exemplary embodiment, the host system 11 is coupled to the memory storage device 10 through the data transmission interface 114. For example, the host system 11 may store data to the memory storage device 10 or read data from the memory storage device 10 via the data transmission interface 114. In addition, the host system 11 is coupled to the I/O device 12 through the system bus 110. For example, the host system 11 may send an output signal to the I/O device 12 or receive an input signal from the I/O device 12 via the system bus 110.

In the exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner. The memory storage device 10 may, for example, be a flash drive 201, a memory card 202, a solid state drive (SSD) 203, or a wireless memory storage device 204. The wireless memory storage device 204 may, for example, be a near field communication (NFC) memory storage device, a wireless fax (WiFi) memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

Figure 3:
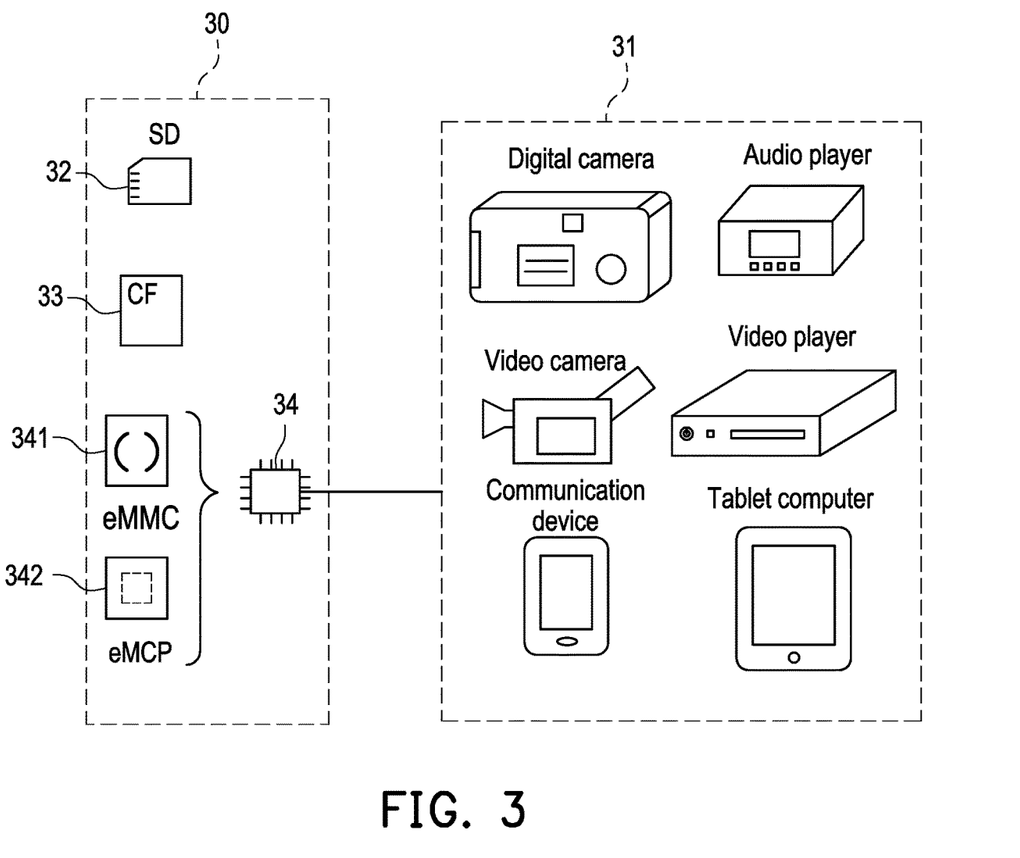
FIG. 3 is a schematic diagram of a host system and a memory storage device according to another exemplary embodiment of the disclosure.

In an exemplary embodiment, the host system is any system that may substantially cooperate with a memory storage device to store data. Although in the above exemplary embodiments, the host system is described as a computer system, FIG. 3 is a schematic diagram of a host system and a memory storage device according to another exemplary embodiment of the disclosure. Please refer to FIG. 3. In another exemplary embodiment, a host system 31 may also be a digital camera, a video camera, a communication device, an audio player, a video player, a tablet computer, or other systems, and a memory storage device 30 may be a secure digital (SD) card 32, a compact flash (CF) card 33, an embedded storage device 34, or various other non-volatile memory storage devices used thereby. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
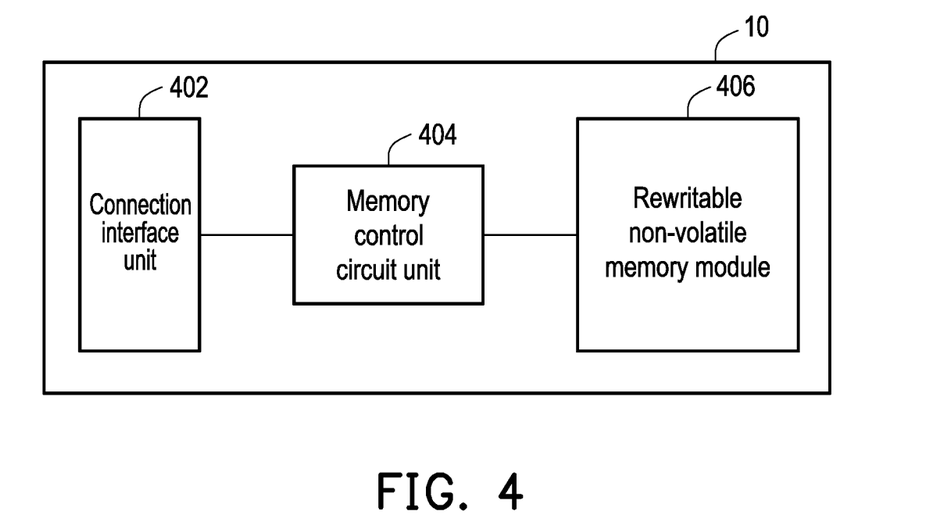
FIG. 4 is a schematic block diagram of a memory storage device according to an exemplary embodiment of the disclosure.

FIG. 4 is a schematic block diagram of a memory storage device according to an exemplary embodiment of the disclosure.

Please refer to FIG. 4. The memory storage device 10 includes a connection interface unit 402, a memory control circuit unit 404, and a rewritable non-volatile memory module 406.

The connection interface unit 402 is used to couple the memory storage device 10 to the host system 11. In the exemplary embodiment, the connection interface unit 402 is compatible with the serial advanced technology attachment (SATA) standard. However, it must be understood that the disclosure is not limited thereto. The connection interface unit 402 may also conform to the parallel advanced technology attachment (PATA) standard, the Institute of Electrical and Electronic Engineers (IEEE) 1394 standard, the peripheral component interconnect express (PCI express) standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 402 may be packaged in one chip with the memory control circuit unit 404, or the connection interface unit 402 may be arranged outside a chip containing the memory control circuit unit 404.

The memory control circuit unit 404 is used to execute multiple logic gates or control commands implemented in the form of hardware or the form of firmware and perform operations such as data writing, reading, and erasing in the rewritable non-volatile memory module 406 according to a command of the host system 11.

The rewritable non-volatile memory module 406 is coupled to the memory control circuit unit 404 and is used to store data written by the host system 11. The rewritable non-volatile memory module 406 may be a single level cell (SLC) NAND flash memory module (that is, a flash memory module that may store 1 bit in one memory cell), a multi level cell (MLC) NAND flash memory module (that is, a flash memory module that may store 2 bits in one memory cell), a triple level cell (TLC) NAND flash memory module (that is, a flash memory module that may store 3 bits in one memory cell), other flash memory modules, or other memory modules with the same characteristics.

Each memory cell in the rewritable non-volatile memory module 406 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data into the memory cell" or "programming the memory cell". As the threshold voltage changes, each memory cell in the rewritable non-volatile memory module 406 has multiple storage states. Through applying a read voltage, it is possible to judge which storage state a memory cell belongs to, thereby obtaining one or more bits stored in the memory cell.

In the exemplary embodiment, memory cells of the rewritable non-volatile memory module 406 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be classified into at least a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit, and/or the reliability of the lower physical programming unit is higher than the reliability of the upper physical programming unit.

In the exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units usually include a data bit area and a redundancy bit area. The data bit area contains multiple physical sectors for storing user data, and the redundancy bit area is used to store system data (for example, management data such as an error correcting code). In the exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 5:
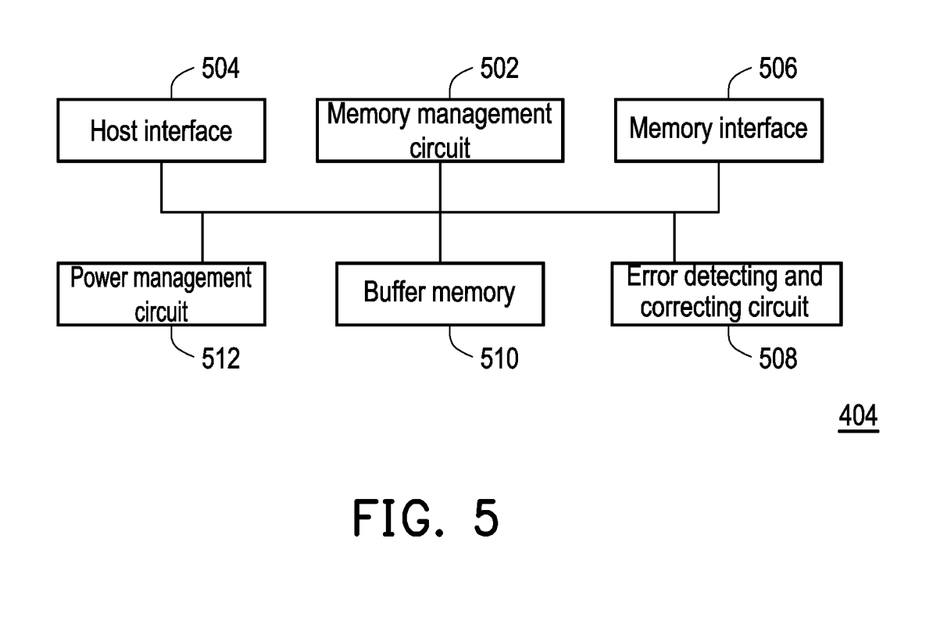
FIG. 5 is a schematic block diagram of a memory control circuit unit according to an exemplary embodiment of the disclosure.

FIG. 5 is a schematic block diagram of a memory control circuit unit according to an exemplary embodiment of the disclosure.

Please refer to FIG. 5. The memory control circuit unit 404 includes a memory management circuit 502, a host interface 504, and a memory interface 506.

The memory management circuit 502 is used to control the overall operation of the memory control circuit unit 404. Specifically, the memory management circuit 502 has multiple control commands, and the control commands are executed to perform operations such as data writing, reading, and erasing when the memory storage device 10 is operating. The following description of the operation of the memory management circuit 502 is equivalent to the description of the operation of the memory control circuit unit 404.

In the exemplary embodiment, the control commands of the memory management circuit 502 are implemented in the form of firmware. For example, the memory management circuit 502 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In another exemplary embodiment, the control commands of the memory management circuit 502 may also be stored to a specific region (for example, a system area dedicated to storing system data in a memory module) of the rewritable non-volatile memory module 406 in the form of program codes. In addition, the memory management circuit 502 has a microprocessor unit (not shown), a read only memory (not shown), and a random access memory (not shown). In particular, the read only memory has a boot code, and the microprocessor unit first executes the boot code to load the control commands stored in the rewritable non-volatile memory module 406 to the random access memory of the memory management circuit 502 when the memory control circuit unit 404 is enabled. After that, the microprocessor unit runs the control commands to perform operations such as data writing, reading, and erasing.

In addition, in another exemplary embodiment, the control commands of the memory management circuit 502 may also be implemented in the form of hardware. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a group thereof of the rewritable non-volatile memory module 406. The memory write circuit is used to issue a write command sequence to the rewritable non-volatile memory module 406 to write data into the rewritable non-volatile memory module 406. The memory read circuit is used to issue a read command sequence to the rewritable non-volatile memory module 406 to read data from the rewritable non-volatile memory module 406. The memory erase circuit is used to issue an erase command sequence to the rewritable non-volatile memory module 406 to erase data from the rewritable non-volatile memory module 406. The data processing circuit is used to process data to be written into the rewritable non-volatile memory module 406 and data read from the rewritable non-volatile memory module 406. The write command sequence, the read command sequence, and the erase command sequence may each include one or more program codes or command codes and are used to instruct the rewritable non-volatile memory module 406 to execute corresponding operations such as writing, reading, and erasing. In an exemplary embodiment, the memory management circuit 502 may also issue other types of command sequences to the rewritable non-volatile memory module 406 to instruct to execute corresponding operations.

The host interface 504 is coupled to the memory management circuit 502 and is used to receive and identify commands and data sent by the host system 11. In other words, the commands and the data sent by the host system 11 may be sent to the memory management circuit 502 through the host interface 504. In the exemplary embodiment, the host interface 504 is compatible with the SATA standard. However, it must be understood that the disclosure is not limited thereto. The host interface 504 may also be compatible with the PATA standard, the IEEE 1394 standard, the PCI express standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 506 is coupled to the memory management circuit 502 and is used to access the rewritable non-volatile memory module 406. In other words, the data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, executing a garbage collection operation, etc.). The command sequences are, for example, generated by the memory management circuit 502 and sent to the rewritable non-volatile memory module 406 through the memory interface 506. The command sequences may include one or more signals, or data on a bus. The signals or the data may include command codes or program codes. For example, the read command sequence includes information such as a read recognition code and memory address.

In an exemplary embodiment, the memory control circuit unit 404 further includes an error detecting and correcting circuit 508, a buffer memory 510, and a power management circuit 512.

The error detecting and correcting circuit 508 is coupled to the memory management circuit 502 and is used to an execute error detecting and correcting operation to ensure the correctness of data. Specifically, when the memory management circuit 502 receives a write command from the host system 11, the error detecting and correcting circuit 508 generates a corresponding error correcting code (ECC) and/or error detecting code (EDC) for the data corresponding to the write command, and the memory management circuit 502 writes the data corresponding to the write command and the corresponding ECC and/or EDC into the rewritable non-volatile memory module 406. Later, when the memory management circuit 502 reads the data from the rewritable non-volatile memory module 406, the ECC and/or the EDC corresponding to the data will be simultaneously read, and the error detecting and correcting circuit 508 will execute the error detecting and correcting operation on the read data according to the ECC and/or the EDC.

The buffer memory 510 is coupled to the memory management circuit 502 and is used to buffer data and commands from the host system 11 or data from the rewritable non-volatile memory module 406. The power management circuit 512 is coupled to the memory management circuit 502 and is used to control the power of the memory storage device 10.

Figure 6:
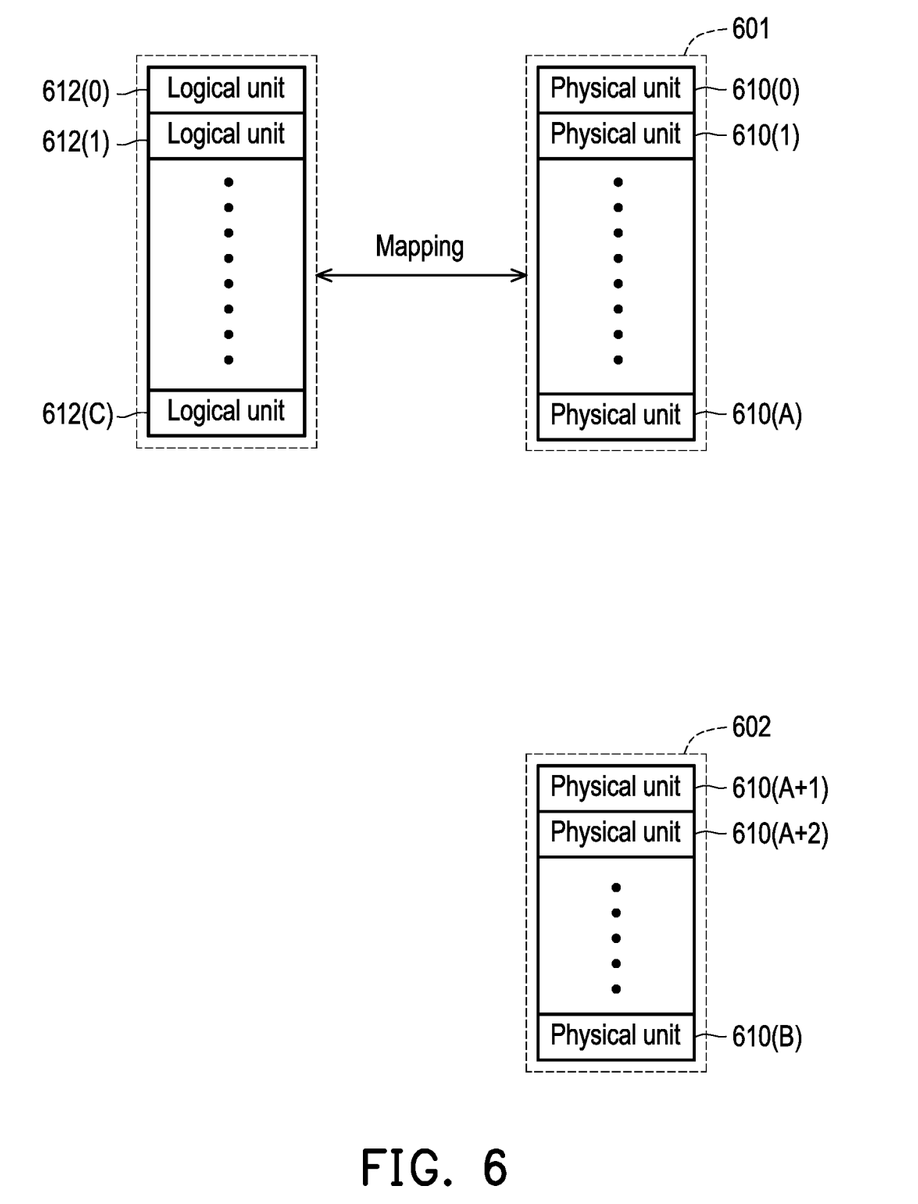
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure.

Please refer to FIG. 6. The memory management circuit 502 logically groups physical units 610(0) to 610(B) of the rewritable non-volatile memory module 406 into a storage area 601 and a spare area 602. The physical units 610(0) to 610(A) in the storage area 601 are stored with data. For example, the data stored to the storage area 601 includes valid data and invalid data. The physical units 610(A+1) to 610(B) in the spare area 602 have not been used to store data. When data is to be stored, the memory management circuit 502 selects a physical unit from the physical units 610(A+1) to 610(B) in the spare area 602 and stores data from the host system 11 or from other physical units in the storage area 601 to the selected physical unit. At the same time, the selected physical unit is associated with the storage area 601. In addition, after erasing a certain physical unit in the storage area 601, the erased physical unit is re-associated with the spare area 602.

In the exemplary embodiment, each physical unit belonging to the spare area 602 is also referred to as a spare physical unit, and each physical unit belonging to the storage area 601 is also referred to as a non-spare physical unit. In the exemplary embodiment, a physical unit refers to a physical erasing unit. However, in another exemplary embodiment, one physical unit may also contain multiple physical erasing units.

The memory management circuit 502 configures logical units 612(0) to 612(C) to map the physical units 610(0) to 610(A) in the storage area 601. In the exemplary embodiment, each logical unit refers to a logical address. However, in another exemplary embodiment, a logical unit may also refer to a logical programming unit, a logical erasing unit, or composed of multiple continuous or discontinuous logical addresses. In addition, each of the logical units 612(0) to 612(C) may be mapped to one or more physical units.

The memory management circuit 502 records a mapping relationship (also referred to as a logical-physical address mapping relationship) between the logical unit and the physical unit into at least one logical-physical mapping table. When the host system 11 intends to read data from the memory storage device 10 or write data into the memory storage device 10, the memory management circuit 502 may execute a data accessing operation on the memory storage device 10 according to the logical-physical mapping table.

In the exemplary embodiment, if data belonging to a certain logical unit is updated, a mapping relationship between the logical unit and a physical unit stored with old data belonging to the logical unit will be removed, and a mapping relationship between the logical unit and a physical unit stored with latest data belonging to the logical unit will be established. However, in another exemplary embodiment, if data belonging to a certain logical unit is updated, a mapping relationship between the logical unit and a physical unit stored with old data belonging to the logical unit may still be maintained.

In an exemplary embodiment, the memory management circuit 502 receives multiple first continuous data from the host system 11, wherein the host system 11 instructs to store the first continuous data to first continuous logical addresses in the logical addresses.

Figure 7:
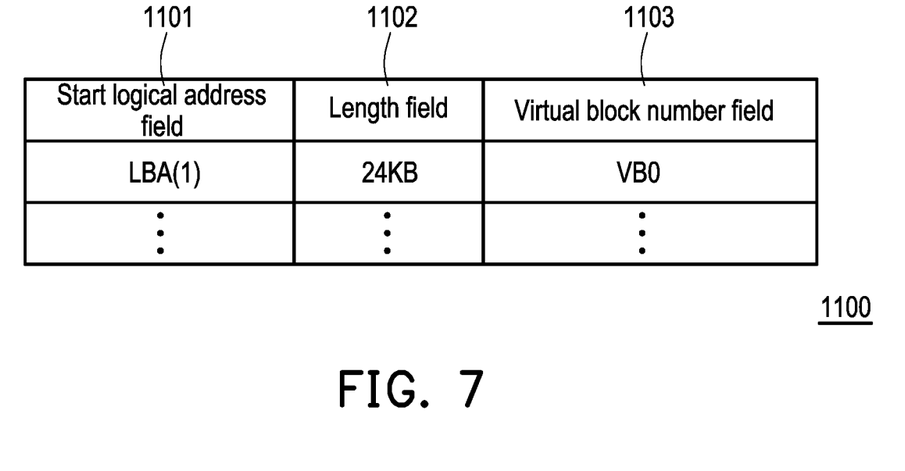
FIG. 7 is a schematic diagram of a continuous mapping table according to an exemplary embodiment of the disclosure.
Figure 8:
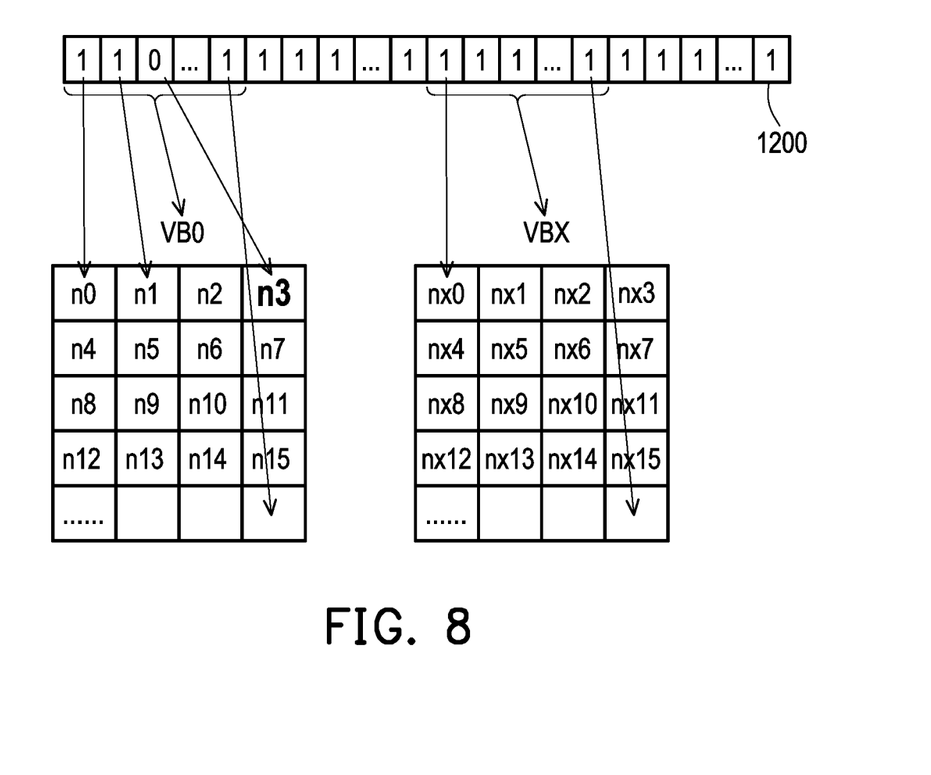
FIG. 8 is a schematic diagram of a bitmap according to an exemplary embodiment of the disclosure.

FIG. 7 is a schematic diagram of a continuous mapping table according to an exemplary embodiment of the disclosure. FIG. 8 is a schematic diagram of a bitmap according to an exemplary embodiment of the disclosure.

Please refer to FIG. 7 and FIG. 8. The memory management circuit 502 establishes at least one continuous mapping table 1100, wherein the continuous mapping table 1100 is used to record a start logical address of the first continuous logical address to which the first continuous data are stored, the length of the first continuous logical address, the number of a virtual block corresponding to the first continuous logical address, and a bitmap.

In an exemplary embodiment, the continuous mapping table 1100 includes a start logical address field 1101, a length field 1102, and a virtual block number field 1103, wherein the start logical address field 1101 is used to record the start logical address of the first continuous logical address to which the first continuous data are stored, the length field 1102 records the length of the first continuous logical address, and the virtual block number field 1103 is used to record the number of the virtual block corresponding to the first continuous logical address.

In another exemplary embodiment, the continuous mapping table 1100 further includes a bitmap 1200, and the memory management circuit 502 numbers the virtual blocks and records numbers VB0, VB1 . . . VBX . . . of the virtual blocks into the virtual block number field 1103, wherein the virtual block VB0 includes a bit n0, a bit n1, a bit n2, a bit n3 . . . , the virtual block VBX includes a bit nx0, a bit nx1, a bit nx2, a bit nx3 . . . , and so on, wherein one bit is used to map a 4 KB, 8 KB, or 16 KB logical address, but the disclosure is not limited thereto.

The memory management circuit 502 divides a part of the buffer memory 510 to store the continuous mapping table, so as to record the mapping relationship between the logical address and the physical programming unit into which the continuous data is written.

Please refer to FIG. 8 again. The memory management circuit 502 writes the first continuous data into the first physical programming unit mapped to the first continuous logical address and marks a bit of the virtual block corresponding to the first continuous logical address in the bitmap 1200 as a valid state, and the memory management circuit 502 numbers the virtual blocks and respectively records the start logical address of the first continuous logical address to which the first continuous data are stored, the length of the first continuous logical address, and the number of the virtual block corresponding to the first continuous logical address into the start logical address field 1101, the length field 1102, and the virtual block number field 1103 of the continuous mapping table 1100.

In an exemplary embodiment, the memory management circuit 502 receives at least one random data from the host system 11, wherein the host system 11 instructs to store the random data to a second logical address in the first continuous logical address, and the memory management circuit 502 overwrites the random data into multiple second physical programming units in the first physical programming unites mapped to the second logical addresses and marks a bit of a virtual block corresponding to the second logical address in the bitmap 1200 as an invalid state.

In an exemplary embodiment, the memory management circuit 502 uses states of bits recorded in the bitmap 1200 to identify whether the first continuous data written into the first physical programming unit is overwritten. For example, when the bit in the bitmap 1200 is marked as "0", it means that the data stored to the corresponding physical programming unit is overwritten, and when the bit in the bitmap 1200 is marked as "1", it means that the data stored to the corresponding physical programming unit is continuous data that is not overwritten, but the disclosure is not limited thereto.

In an exemplary embodiment, the memory management circuit 502 receives a read command from the host system 11. The memory management circuit 502 judges whether logical addresses instructed corresponding to the read command include the second logical address. If the logical addresses instructed corresponding to the read command do not include the second logical address, the memory management circuit 502 reads read data corresponding to the read command from the rewritable non-volatile memory module 406 according to the continuous mapping table 1100; and if the logical addresses instructed corresponding to the read command include the second logical address, for a logical address that is the same as the second logical address in the logical addresses instructed corresponding to the read command, the memory management circuit 502 reads data of the logical address that is the same as the second logical address in the logical addresses instructed corresponding to the read command from the rewritable non-volatile memory module 406 according to a logical-physical address mapping table, and for a logical address that is different from the second logical address in the logical addresses instructed corresponding to the read command, the memory management circuit 502 reads data of the logical address that is different from the second logical address in the logical addresses instructed corresponding to the read command from the rewritable non-volatile memory module 406 according to the continuous mapping table 1100.

In an exemplary embodiment, one bit being mapped to a 4 KB logical address is taken as an example. The host system 11 instructs to write continuous data with a length of 24 KB into the rewritable non-volatile memory module 406. The memory management circuit 502 writes the continuous data with the length of 24 KB into the first physical programming units mapped to first continuous logical addresses LBA(1) to LBA(24 KB). The memory management circuit 502 marks the bits n0, n1, n2, n3, n4, and n5 of the virtual block VB0 corresponding to the first continuous logical addresses LBA(1) to LBA(24 KB) in the bitmap 1200 as the valid state "1" according to the start logical address of the first continuous logical address LBA(1) and the continuous data with the length of 24 KB, and the start logical address being LBA(1), the length of 24 KB of the continuous data, the number of the virtual block VB0 corresponding to the first continuous logical addresses LBA (1) to LBA(24 KB), and the bitmap 1200 in which the bits n0, n1, n2, n3, n4, and n5 of the virtual block VB0 are marked as the valid state "1" are also recorded into the continuous mapping table 1100.

In an exemplary embodiment, the memory management circuit 502 receives random data with a length of 4 KB from the host system 11, wherein the host system 11 instructs to store the random data with the length of 4 KB to second logical addresses in the first continuous logical addresses LBA(1) to LBA(24 KB), wherein the second logical addresses are, for example, LBA(12 KB) to LBA(16 KB). The memory management circuit 502 overwrites the random data with the length of 4 KB into the second physical programming units mapped to the second logical addresses LBA(12 KB) to LBA(16 KB). The memory management circuit 502 marks the bit n3 of the virtual block VB0 corresponding to the second logical addresses LBA(12 KB) to LBA(16 KB) in the bitmap 1200 as the invalid state "0" according to the second logical addresses LBA(12 KB) to LBA(16 KB) and the random data with the length of 4 KB.

In an exemplary embodiment, the memory management circuit 502 receives the read command from the host system 11 and judges whether the logical addresses instructed corresponding to the read command include the second logical addresses LBA(12 KB) to LBA(16 KB). If the logical addresses instructed corresponding to the read command do not include the second logical addresses LBA(12 KB) to LBA(16 KB), for example, the logical addresses instructed corresponding to the read command are LBA(1) to LBA(12 KB−1) or LBA(16 KB+1) to LBA (24 KB), and the disclosure is not limited thereto, the memory management circuit 502 will read the read data corresponding to the read command from the rewritable non-volatile memory module 406 according to the continuous mapping table 1100; and if the logical addresses instructed corresponding to the read command include the second logical addresses, for example, the logical addresses instructed corresponding to the read command are LBA(12 KB) to LBA(18 KB), for the logical addresses LBA(12 KB) to LBA(16 KB) that are the same as the second logical addresses in the logical addresses instructed corresponding to the read command, the memory management circuit 502 judges that data on the first physical programming units mapped to the logical addresses LBA(12 KB) to LBA(16 KB) are overwritten, and the memory management circuit 502 reads data of the logical addresses that are the same as the second logical addresses in the logical addresses instructed corresponding to the read command from the rewritable non-volatile memory module 406 according to the logical-physical address mapping table, and for logical addresses LBA(16 KB+1) to LBA(18 KB) that are different from the second logical addresses in the logical addresses in the logical addresses instructed corresponding to the read command, the memory management circuit 502 directly reads data of the logical addresses that are different from the second logical addresses in the logical addresses instructed corresponding to the read command from the rewritable non-volatile memory module 406 according to the continuous mapping table 1100.

Alternatively, after writing the first continuous data and the random data into the physical programming units of the rewritable non-volatile memory module 406, the memory management circuit 502 may also directly judge that the second physical programming units mapped to the second logical addresses LBA(12 KB) to LBA(16 KB) are overwritten by the random data according to the bit n3 marked as the invalid state "0" in the bitmap 1200. Therefore, for the logical addresses that are the same as the second logical addresses LBA(12 KB) to LBA(16 KB) in the logical addresses instructed corresponding to the read command, the memory management circuit 502 directly calls the logical-physical address mapping table to read data from the rewritable non-volatile memory module 406. For the logical addresses that are different from the second logical addresses in the logical addresses instructed corresponding to the read command, the memory management circuit 502 reads data from the rewritable non-volatile memory module 406 according to the continuous mapping table 1100.

It should be noted that in the above exemplary embodiments, in the operation of the memory management circuit 502 writing the first continuous data and the random data into the physical programming units of the rewritable non-volatile memory module 406, the memory management circuit 502 records the mapping relationship between the logical unit and the physical unit (also referred to as the logical-physical address mapping relationship) into at least one logical-physical mapping table.

Figure 9:
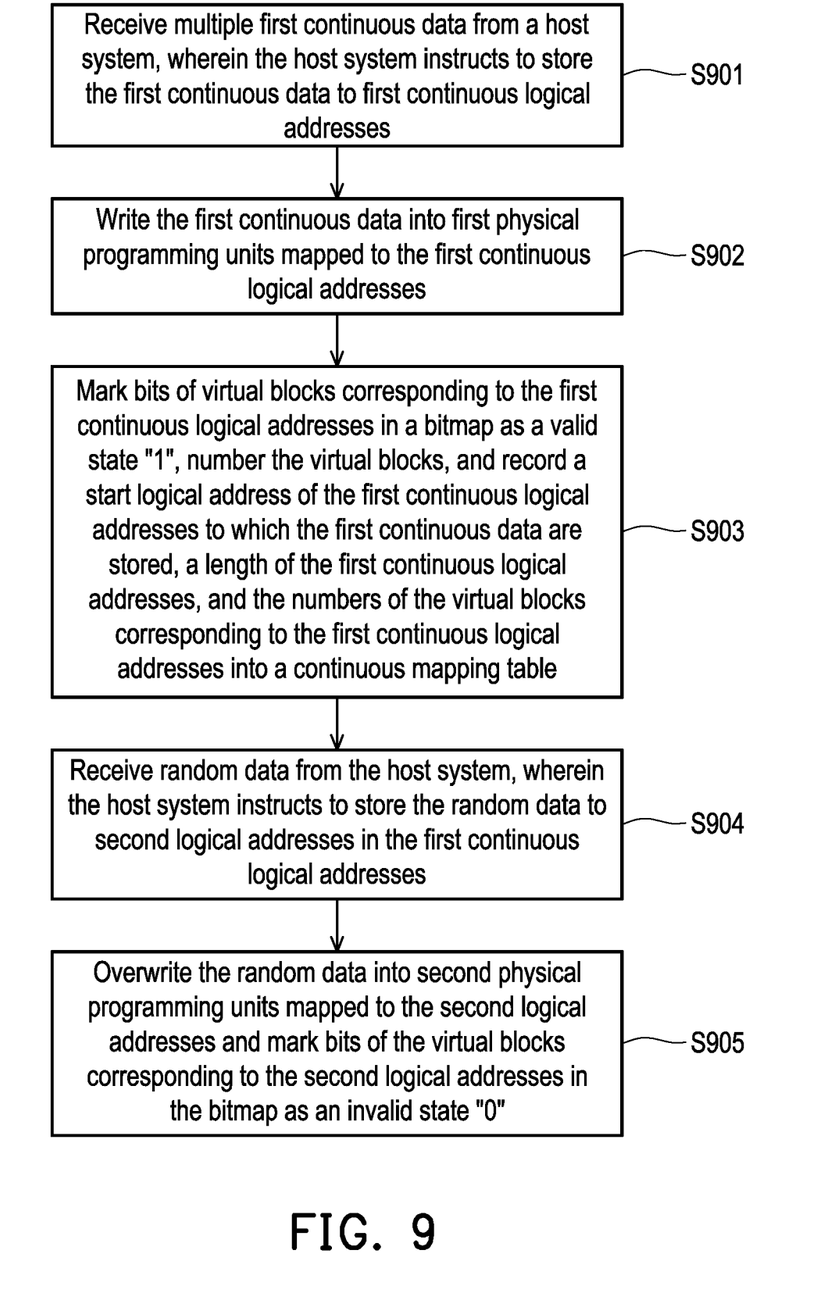
FIG. 9 is a flowchart of writing first continuous data and random data into a rewritable non-volatile memory module according to an exemplary embodiment of the disclosure.

FIG. 9 is a flowchart of the memory management circuit 502 writing first continuous data and random data into a rewritable non-volatile memory module according to an exemplary embodiment of the disclosure.

Please refer to FIG. 9. In Step S901, the memory management circuit 502 receives multiple first continuous data from the host system 11, wherein the host system 11 instructs to store the first continuous data to first continuous logical addresses.

In Step S902, the memory management circuit 502 writes the first continuous data into first physical programming units mapped to the first continuous logical addresses.

In Step S903, the memory management circuit 502 marks bits of virtual blocks corresponding to the first continuous logical addresses in the bitmap 1200 as a valid state "1", and the memory management circuit 502 numbers the virtual blocks and records a start logical address of the first continuous logical addresses to which the first continuous data are stored, a length of the first continuous logical addresses, and numbers of the virtual blocks corresponding to the first continuous logical addresses into the continuous mapping table 1100.

In Step S904, the memory management circuit 502 receives random data from the host system 11, wherein the host system 11 instructs to store the random data to second logical addresses in the first continuous logical addresses.

In Step S905, the memory management circuit 502 overwrites the random data into second physical programming units mapped to the second logical addresses and marks bits of virtual blocks corresponding to the second logical addresses in the bitmap 1200 as an invalid state "0".

Figure 10:
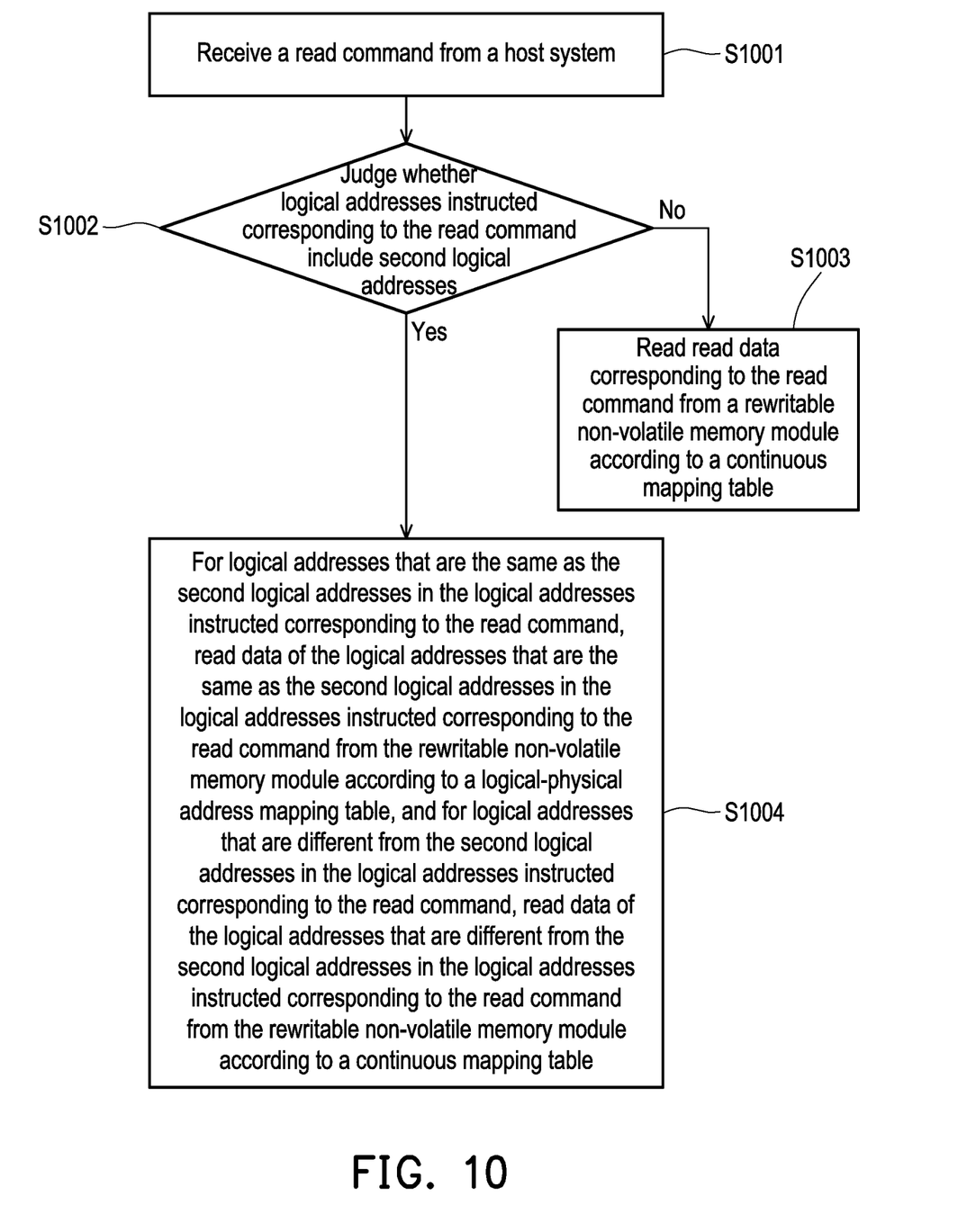
FIG. 10 is a flowchart of reading first continuous data and random data according to an exemplary embodiment of the disclosure.

FIG. 10 is a flowchart of the memory management circuit 502 reading first continuous data and random data from a rewritable non-volatile memory module according to an exemplary embodiment of the disclosure.

Please refer to FIG. 10. In Step S1001, the memory management circuit 502 receives a read command from the host system 11.

In Step S1002, the memory management circuit 502 judges whether logical addresses instructed corresponding to the read command include second logical addresses.

If the logical addresses instructed corresponding to the read command do not include the second logical addresses, in Step S1003, the memory management circuit 502 reads read data corresponding to the read command from the rewritable non-volatile memory module 406 according to the continuous mapping table 1100.

If the logical addresses instructed corresponding to the read command include the second logical addresses, in Step S1004, for logical addresses that are the same as the second logical addresses in the logical addresses instructed corresponding to the read command, the memory management circuit 502 reads data of the logical addresses that are the same as the second logical addresses in the logical addresses instructed corresponding to the read command from the rewritable non-volatile memory module 406 according to a logical-physical address mapping table, and for logical addresses that are different from the second logical addresses in the logical addresses instructed corresponding to the read command, the memory management circuit 502 reads data of the logical addresses that are different from the second logical addresses in the logical addresses instructed corresponding to the read command from the rewritable non-volatile memory module 406 according to a continuous mapping table.

Figure 11:
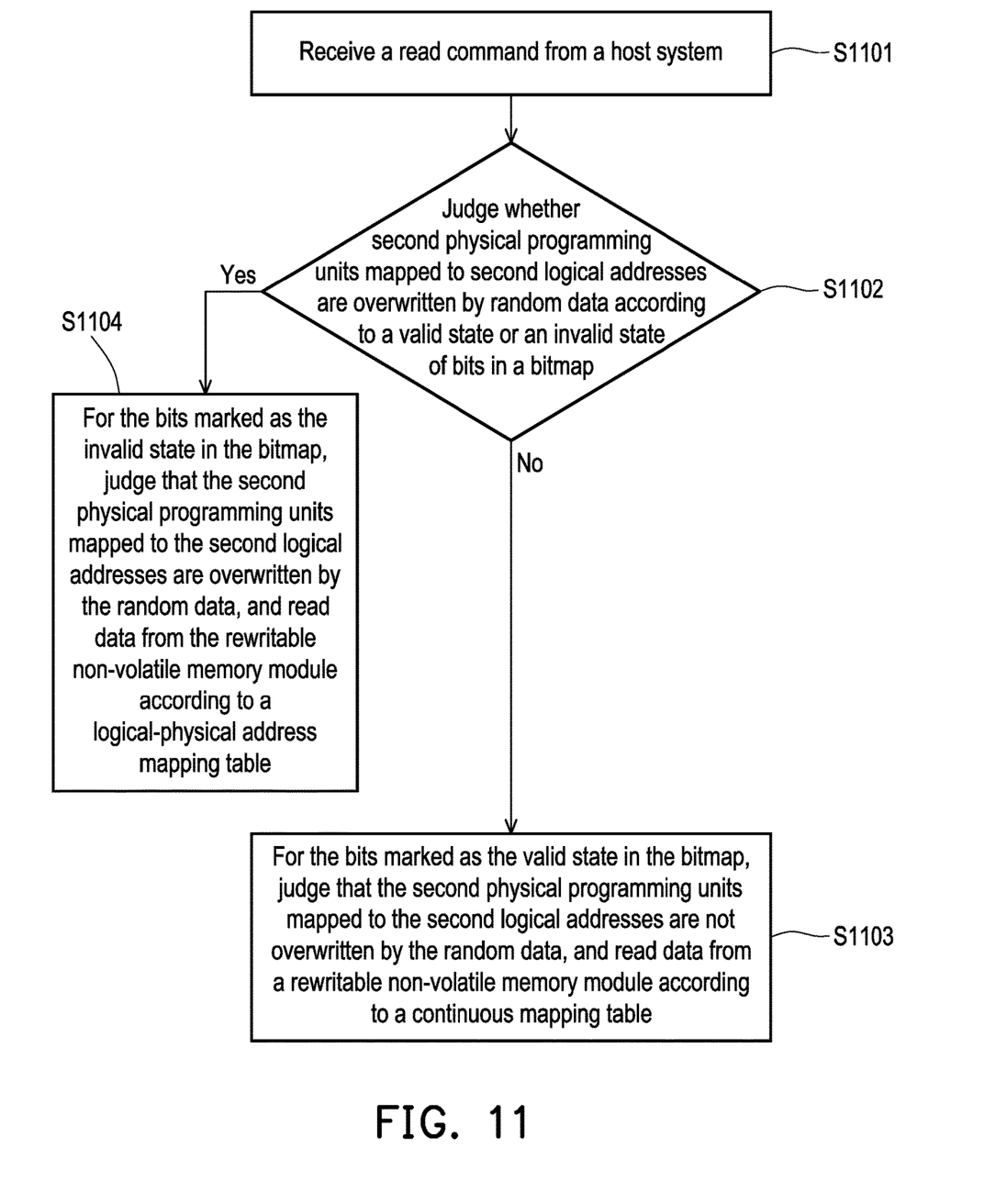
FIG. 11 is a flowchart of reading first continuous data and random data according to another exemplary embodiment of the disclosure.

FIG. 11 is a flowchart of the memory management circuit 502 reading first continuous data and random data from a rewritable non-volatile memory module according to another exemplary embodiment of the disclosure.

Please refer to FIG. 11. In Step S1101, the memory management circuit 502 receives a read command from the host system 11.

After writing the first continuous data and the random data into physical programming units of the rewritable non-volatile memory module 406, in Step S1102, the memory management circuit 502 judges whether second physical programming units mapped to second logical addresses are overwritten by the random data according to a valid state or an invalid state of bits in the bitmap 1200.

In Step S1103, for the bits marked as the valid state in the bitmap 1200, the memory management circuit 502 judges that the second physical programming units mapped to the second logical addresses are not overwritten by the random data, and the memory management circuit 502 reads data from the rewritable non-volatile memory module 406 according to the continuous mapping table 1100.

In Step S1104, for the bits marked as the invalid state in the bitmap 1200, the memory management circuit 502 judges that the second physical programming units mapped to the second logical addresses are overwritten by the random data, and the memory management circuit 502 directly calls a logical-physical address mapping table to read data from the rewritable non-volatile memory module 406.

Each step in FIG. 9, FIG. 10, and FIG. 11 may be implemented as multiple program codes or circuits, which are not limited in the disclosure.

In summary, in the mapping information recording method, the memory controller, and the memory storage device provided by the embodiments of the disclosure, the start logical address of the written continuous data, the length of the continuous data, the numbers of the virtual blocks, and the bitmap are recorded through establishing the continuous mapping table, and the states of the bits are marked in the bitmap, the mapping relationship between the logical address and the physical programming unit is recorded with less amount of data, and whether the physical programming units are overwritten by the random data is identified according to the marked states of the bits in the bitmap, so as to select whether to call the continuous mapping table or the logical-physical address mapping table to read data from the rewritable non-volatile memory module, so as to randomly read the written data more quickly and effectively in a limited random access memory space of a flash memory storage system to effectively improve the performance of the flash memory storage system.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A mapping information recording method for a rewritable non-volatile memory module, the rewritable non-volatile memory module comprising a plurality of physical erasing units, and each of the physical erasing units comprising a plurality of physical programming units, comprising:

receiving a plurality of first continuous data from a host system, wherein the host system instructs to store the first continuous data to a plurality of first continuous logical addresses in a plurality of logical addresses;

establishing at least one continuous mapping table, wherein the at least one continuous mapping table is used to record a start logical address of the first continuous logical addresses to which the first continuous data are stored, a length of the first continuous logical addresses, and a bitmap;

writing the first continuous data into a plurality of first physical programming units in the physical programming units of the physical erasing units; and marking bits of a plurality of virtual blocks corresponding to the first continuous logical addresses in the bitmap as a valid state, numbering the virtual blocks, and recording the numbers into the at least one continuous mapping table.

2. The mapping information recording method according to claim 1, further comprising:
receiving at least one random data from the host system, wherein the host system instructs to store the at least one random data to at least one second logical address in the first continuous logical addresses;
overwriting the at least one random data into a plurality of second physical programming units in the first physical programming units; and
marking bits of the virtual blocks corresponding to the at least one second logical address in the bitmap as an invalid state.

3. The mapping information recording method according to claim 2, wherein the at least one continuous mapping table comprises at least a start logical address field, a virtual block number field, and a length field, wherein the start logical address field is used to record the start logical address of the first continuous logical addresses to which the first continuous data are stored, the virtual block number field is used to record the numbers of the virtual blocks corresponding to the first continuous logical addresses, and the length field records the length of the first continuous logical addresses.

4. The mapping information recording method according to claim 2, further comprising:
establishing at least one logical-physical address mapping table and storing the at least one logical-physical address mapping table to the rewritable non-volatile memory module, and updating a mapping relationship between the first continuous logical addresses and the first physical programming units in the at least one logical-physical address mapping table.

5. The mapping information recording method according to claim 4, wherein after writing the first continuous data and the at least one random data into the physical programming units of the rewritable non-volatile memory module, the mapping information recording method further comprises:
receiving a read command from the host system;
judging whether a logical address instructed corresponding to the read command comprises the at least one second logical address; and
if the logical address instructed corresponding to the read command does not comprise the at least one second logical address, reading read data corresponding to the read command from the rewritable non-volatile memory module according to the at least one continuous mapping table.

6. The mapping information recording method according to claim 5, further comprising:
if the logical address instructed corresponding to the read command comprises the at least one second logical address,
for a logical address that is the same as the at least one second logical address in the logical address instructed corresponding to the read command, reading data of the logical address that is the same as the at least one second logical address in the logical address instructed corresponding to the read command from the rewritable non-volatile memory module according to the at least one logical-physical address mapping table, and
for a logical address that is different from the at least one second logical address in the logical address instructed corresponding to the read command, reading data of the logical address that is different from the at least one second logical address in the logical address instructed corresponding to the read command from the rewritable non-volatile memory module according to the at least one continuous mapping table.

7. The mapping information recording method according to claim 4, wherein after writing the first continuous data and the at least one random data into the physical programming units of the rewritable non-volatile memory module, the mapping information recording method further comprises:
receiving a read command from the host system;
determining whether a second physical programming unit mapped to the at least one second logical address is overwritten by the at least one random data according to a state of a bit in the bitmap;
if the second physical programming unit mapped to the at least one second logical address is not overwritten by the at least one random data, reading data from the rewritable non-volatile memory module according to the at least one continuous mapping table; and
if the second physical programming unit mapped to the at least one second logical address is overwritten by the at least one random data, reading data from the rewritable non-volatile memory module according to the at least one logical-physical address mapping table.

8. A memory storage device, comprising:
a connection interface, used to couple to a host system;
a rewritable non-volatile memory module, wherein the rewritable non-volatile memory module comprises a plurality of physical erasing units, and each of the physical erasing units comprises a plurality of physical programming units; and
a memory control circuit, coupled to the connection interface unit and the rewritable non-volatile memory module, wherein
the memory control circuit is used to receive a plurality of first continuous data from the host system, wherein the host system instructs to store the first continuous data to a plurality of first continuous logical addresses in a plurality of logical addresses,
the memory control circuit is used to establish at least one continuous mapping table, wherein the at least one continuous mapping table is used to record a start logical address of the first continuous logical addresses to which the first continuous data are stored, a length of the first continuous logical addresses, and a bitmap,
the memory control circuit is used to write the first continuous data into a plurality of first physical programming units in the physical programming units of the physical erasing units, and
the memory control circuit is used to mark bits of a plurality of virtual blocks corresponding to the first continuous logical addresses in the bitmap as a valid state, number the virtual blocks, and record the numbers into the at least one continuous mapping table.

9. The memory storage device according to claim 8, wherein:
the memory control circuit is further used to receive at least one random data from the host system, wherein the host system instructs to store the at least one random data to at least one second logical address in the first continuous logical addresses,
the memory control circuit is further used to overwrite the at least one random data into a plurality of second physical programming units in the first physical programming units, and the memory control circuit is further used to mark bits of the virtual blocks corresponding to the at least one second logical address in the bitmap as an invalid state.

10. The memory storage device according to claim 9, wherein the at least one continuous mapping table comprises at least a start logical address field, a virtual block number field, and a length field, wherein the start logical address field is used to record the start logical address of the first continuous logical addresses to which the first continuous data are stored, the virtual block number field is used to record the numbers of the virtual blocks corresponding to the first continuous logical addresses, and the length field records the length of the first continuous logical addresses.

11. The memory storage device according to claim 9, wherein the memory control circuit is further used to establish at least one logical-physical address mapping table and store the at least one logical-physical address mapping table to the rewritable non-volatile memory module, and update a mapping relationship between the first continuous logical addresses and the first physical programming units in the at least one logical-physical address mapping table.

12. The memory storage device according to claim 11, wherein after the memory control circuit writes the first continuous data and the at least one random data into the physical programming units of the rewritable non-volatile memory module,
the memory control circuit is further used to receive a read command from the host system,
the memory control circuit is further used to judge whether a logical address instructed corresponding to the read command comprises the at least one second logical address, and
if the logical address instructed corresponding to the read command does not comprise the at least one second logical address, the memory control circuit is further used to read data corresponding to the read command from the rewritable non-volatile memory module according to the at least one continuous mapping table.

13. The memory storage device according to claim 12, wherein if the logical address instructed corresponding to the read command comprises the at least one second logical address,
for a logical address that is the same as the at least one second logical address in the logical address instructed corresponding to the read command, the memory control circuit is further used to read data of the logical address that is the same as the at least one second logical address in the logical address instructed corresponding to the read command from the rewritable non-volatile memory module according to the at least one logical-physical address mapping table, and
for a logical address that is different from the at least one second logical address in the logical address instructed corresponding to the read command, the memory control circuit is further used to read data of the logical address that is different from the at least one second logical address in the logical address instructed corresponding to the read command from the rewritable non-volatile memory module according to the at least one continuous mapping table.

14. The memory storage device according to claim 11, wherein after the memory control circuit writes the first continuous data and the at least one random data into the physical programming units of the rewritable non-volatile memory module,
the memory control circuit is further used to receive a read command from the host system;
the memory control circuit is further used to judge whether a second physical programming unit mapped to the at least one second logical address is overwritten by the at least one random data according to a state of a bit in the bitmap;
if the second physical programming unit mapped to the at least one second logical address is not overwritten by the at least one random data, the memory control circuit is further used to read data from the rewritable non-volatile memory module according to the at least one continuous mapping table; and
if the second physical programming unit mapped to the at least one second logical address is overwritten by the at least one random data, the memory control circuit is further used to read data from the rewritable non-volatile memory module according to the at least one logical-physical address mapping table.

15. A memory control circuit unit for controlling a memory storage device, comprising:
a host interface, used to couple to a host system;
a memory interface, used to couple to a rewritable non-volatile memory module, wherein the rewritable non-volatile memory module comprises a plurality of physical erasing units, and each of the physical erasing units comprises a plurality of physical programming units; and
a memory management circuit, coupled to the host interface and the memory interface, wherein
the memory management circuit is used to receive a plurality of first continuous data from the host system, wherein the host system instructs to store the first continuous data to a plurality of first continuous logical addresses in a plurality of logical addresses,
the memory management circuit is used to establish at least one continuous mapping table, wherein the at least one continuous mapping table is used to record a start logical address of the first continuous logical addresses to which the first continuous data are stored, a length of the first continuous logical addresses, and a bitmap,
the memory management circuit is used to write the first continuous data into a plurality of first physical programming units in the physical programming units of the physical erasing units, and
the memory management circuit is used to mark bits of a plurality of virtual blocks corresponding to the first continuous logical addresses in the bitmap as a valid state, number the virtual blocks, and record the numbers into the at least one continuous mapping table.

16. The memory control circuit unit according to claim 15, wherein:
the memory management circuit is further used to receive at least one random data from the host system, wherein the host system instructs to store the at least one random data to at least one second logical address in the first continuous logical addresses,
the memory management circuit is further used to overwrite the at least one random data into a plurality of second physical programming units in the first physical programming units, and
the memory management circuit is further used to mark bits of the virtual blocks corresponding to the at least one second logical address in the bitmap as an invalid state.

17. The memory control circuit unit according to claim 16, wherein the at least one continuous mapping table comprises at least a start logical address field, a virtual block number field, and a length field, wherein the start logical address field is used to record the start logical address of the first continuous logical addresses to which the first continuous data are stored, the virtual block number field is used to record the numbers of the virtual blocks corresponding the first continuous logical addresses, and the length field records the length of the first continuous logical addresses.

18. The memory control circuit unit according to claim 16, wherein the memory management circuit is further used to establish at least one logical-physical address mapping table and store the at least one logical-physical address mapping table to the rewritable non-volatile memory module, and update a mapping relationship between the first continuous logical addresses and the first physical programming units in the at least one logical-physical address mapping table.

19. The memory control circuit unit according to claim 18, wherein after the memory management circuit writes the first continuous data and the at least one random data into the physical programming units of the rewritable non-volatile memory module, the memory management circuit is further used to receive a read command from the host system, the memory management circuit is further used to judge whether a logical address instructed corresponding to the read command comprises the at least one second logical address, and if the logical address instructed corresponding to the read command does not comprise the at least one second logical address, the memory management circuit is further used to read read data corresponding to the read command from the rewritable non-volatile memory module according to the at least one continuous mapping table.

20. The memory control circuit unit according to claim 19, wherein if the logical address instructed corresponding to the read command comprises the at least one second logical address, for a logical address that is the same as the at least one second logical address in the logical address instructed corresponding to the read command, the memory management circuit is further used to read data of the logical address that is the same as the at least one second logical address in the logical address instructed corresponding to the read command from the rewritable non-volatile memory module according to the at least one logical-physical address mapping table, and for a logical address that is different from the at least one second logical address in the logical address instructed corresponding to the read command, the memory management circuit is further used to read data of the logical address that is different from the at least one second logical address in the logical address instructed corresponding to the read command from the rewritable non-volatile memory module according to the at least one continuous mapping table.

21. The memory control circuit unit according to claim 18, wherein after the memory management circuit writes the first continuous data and the at least one random data into the physical programming units of the rewritable non-volatile memory module, the memory management circuit is further used to receive a read command from the host system;

the memory management circuit is further used to judge whether a second physical programming unit mapped to the at least one second logical address is overwritten by the at least one random data according to a state of a bit in the bitmap;

if the second physical programming unit mapped to the at least one second logical address is not overwritten by the at least one random data, the memory management circuit is further used to read data from the rewritable non-volatile memory module according to the at least one continuous mapping table; and if the second physical programming unit mapped to the at least one second logical address is overwritten by the at least one random data, the memory management circuit is further used to read data from the rewritable non-volatile memory module according to the at least one logical-physical address mapping table.

\* \* \* \* \*